No. 669,332. Patented Mar. 5, 1901.
W. TRABUE.
FISHING REEL.
(Application filed Dec. 8, 1900.)
(No Model.) 2 Sheets—Sheet 1.
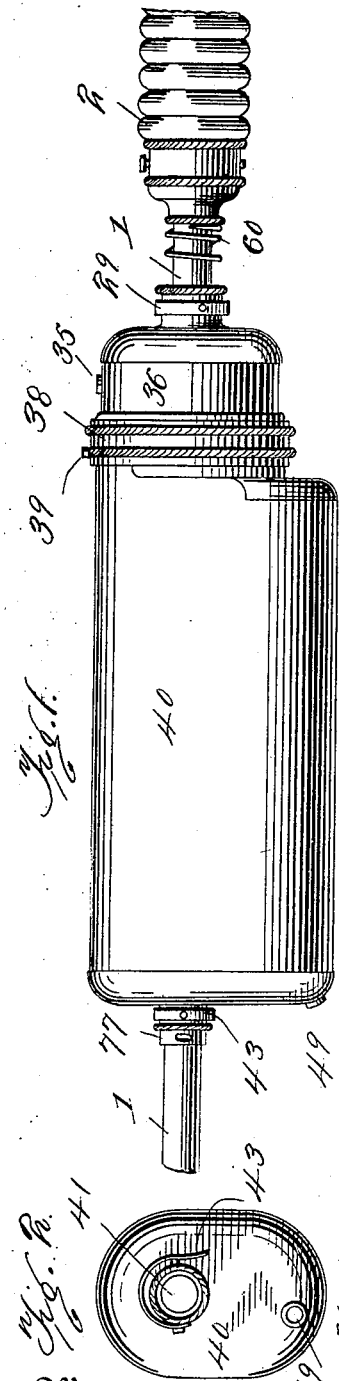
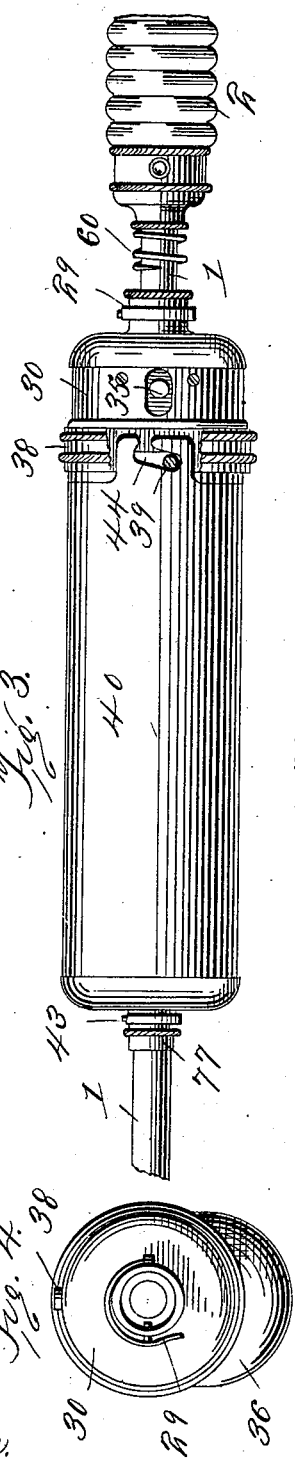
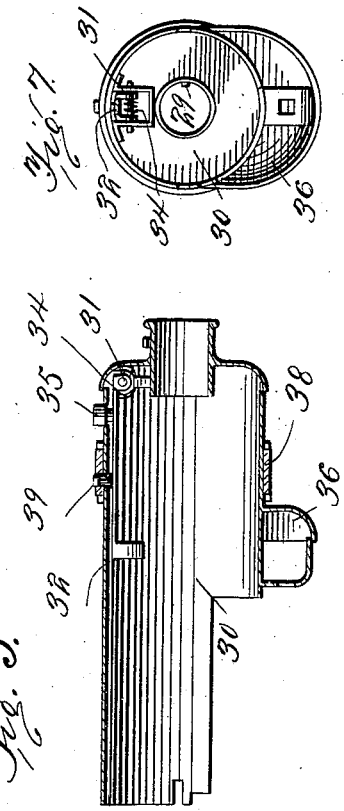
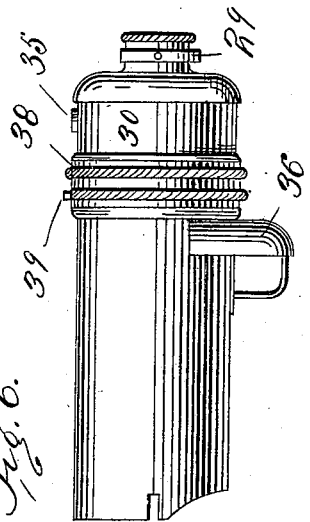
Witnesses
Charles K. Davies.
A. H. Russell.
Inventor
Wm Trabue
By W. H. Bartlett
Attorney

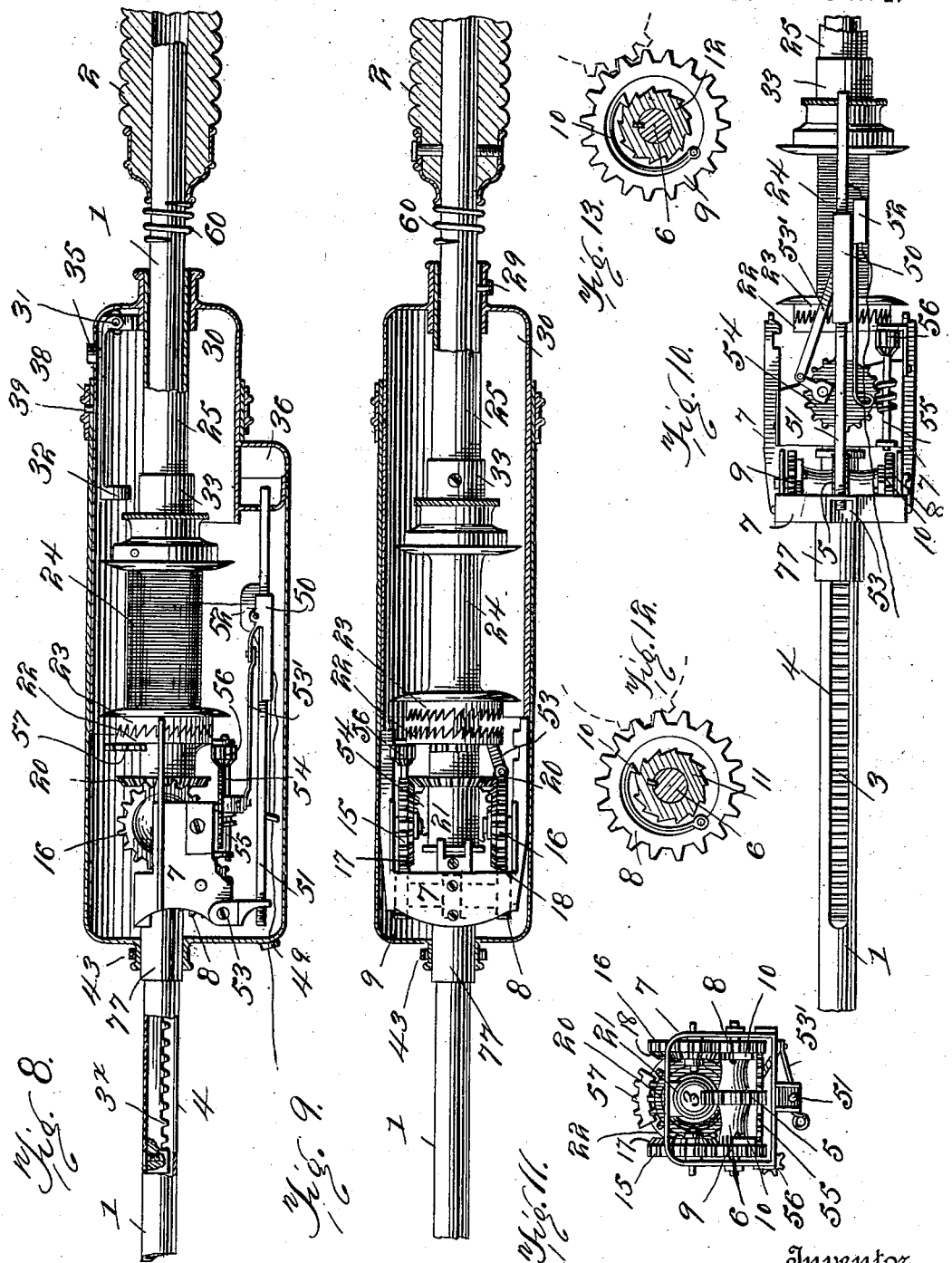

UNITED STATES PATENT OFFICE.

WILLIAM TRABUE, OF LOUISVILLE, KENTUCKY, ASSIGNOR OF THREE-FIFTHS TO ALVAH L. TERRY AND RICHARD TRABUE, OF SAME PLACE.

FISHING-REEL.

SPECIFICATION forming part of Letters Patent No. 669,332, dated March 5, 1901.

Application filed December 8, 1900. Serial No. 39,183. (No model.)

*To all whom it may concern:*

Be it known that I, WILLIAM TRABUE, residing at Louisville, in the county of Jefferson and State of Kentucky, have invented certain new and useful Improvements in Fishing-Reels, of which the following is a specification, reference being had therein to the accompanying drawings.

This invention relates to fishing-rods and reels therefor.

The objects of the invention are to produce a reel in which the winding-spool shall surround or be parallel with the rod instead of transverse thereto and in which the spool shall be turned to wind or reel in the line by the reciprocation of some part of the rod or handle in the direction of the length of the rod; also, to improve the winding-gearing and adapt it to this arrangement of spool; also, to improve the casing and to reduce the casing to convenient form and size, so that when carried in the hand or in a bag there is no considerable projection, thus enabling the rod and reel to be packed in small compass; also, to improve the drag, line-laying mechanism, and other parts of the mechanism.

Figure 1 is a side elevation of the portion of the rod in which the reel and winding mechanism are inclosed, and Fig. 2 a front end view of the reel-casing. Fig. 3 is a top plan, partly broken away, of the handle end of rod and casing. Fig. 4 is a rear end view of the casing. Fig. 5 is a longitudinal section of the inner reel-casing; Fig. 6, an elevation; Fig. 7, a front end view of the same. Fig. 8 is a vertical longitudinal section of the casing, showing reel and reel-winding mechanism in elevation, partly broken away, and reel in winding position. Fig. 9 is a horizontal longitudinal section of casing and gearing, showing clutch detached. Fig. 10 is a detail view of the winding-gears and frame; Fig. 11, a cross-section of winding-gears. Figs. 12 and 13 are details of gear ratchet-and-pawl mechanism looking from the middle outward in each case.

The reference-numeral 1 indicates the core of the fishing-rod, or it may be the rod itself, but is preferably attached to any of the usual forms of flexible or elastic tips. The rod 1 is attached to a hand-grip 2, so as to be reciprocated thereby.

The rod 1 has a rack 3 at one side, or if the rod be a tube, as shown in Fig. 8, the rack $3^\times$ may be secured inside thereof, with the teeth opposite slot 4 in the tube. The rack engages a pinion 5, rigid with sleeve 6, which sleeve acts as a shaft and is supported on a pin or bearing reaching across the frame 7. The cross sleeve or shaft 6 carries pinions 8 and 9, free to rotate on the sleeve or shaft, each having a pawl 10. The pawls 10 are in position to engage ratchets 11 and 12, made rigid with the shaft 6 and facing in opposite directions. Thus the reciprocation of the rack 3 in the direction of its length rotates pinion 5 and shaft 6. As shaft 6 rotates in one direction it causes pinion 11 to turn, while pinion 12 is free, and a reverse movement of the rack reverses the movement of said pinions through the pawl-and-ratchet engagement. Such a mechanical movement is common.

Pinions 8 and 9 have engagement with pinions 15 and 16, supported on suitable bearings in frame 7 and each having a bevel-gear, as 17 and 18, made integral or rigid therewith. Both these bevel-gears engage a bevel-gear 20, but at opposite sides of its center. Bevel-gear 20 is carried on a sleeve 21, surrounding rod 1 and free to rotate on the rod, which reciprocates through said sleeve. From this it will be understood that the reciprocation of rod 1 with reference to shaft 6 causes the sleeve 21 to rotate always in the same direction whether the longitudinal movement of rod 1 be long or short.

Sleeve 21 carries a clutch member 22 at its lower face—that is, the face toward handle 2. A corresponding clutch member 23 is attached to or integral with spool 24, on which the line is wound. Spool 24 has its bearings on sleeve 25, through which rod 1 slides freely. Sleeve 25 forms a basis of support for the inner casing 30, the casing being held to the sleeve by spring-catch 29 or in other suitable manner.

Inner casing 30 supports a drag 31, which is a bar pivoted to casing 30 and having a friction-piece 32 in position to bear on hub 33 of the spool. The drag-bar is itself a spring or is held up by a spring 34, so as to be out of engagement with hub 33. A pin or thumb-piece 35 extends through a slot in casing 30. Pressure on this thumb-piece brings the bearing end 32 of the drag-bar down on the hub 33 of the spool, thus applying friction to the spool and preventing the running out of the line too easily.

The outer casing 40 is of an approximately oval form, while the inner casing is nearly cylindrical for a part of its length, but has a pocket or offset 36 at its lower side and forward end, this pocket and the cylinder producing a form of outline in cross-section like that of casing 40, but enough smaller to enter within the same.

Outer casing or cover 40 has one end closed, except as this end has a hole 41, which surrounds sleeve 77, which sleeve is rigid with frame 7 and surrounds rod 1. The cover 40 has a spring-catch 43, which can snap into a hole in sleeve 77 and so hold casing 40 against longitudinal movement relatively to sleeve 77. Thus the casing 40 and sleeve 77 are held together when spring-catch 43 is engaged with said sleeve.

Cover 40 telescopes over the end of cover 30. Near the end in cover 40 there is an oblique slot 44, opening to the end of the cover. A ring 38, surrounding the cover 30, has an inwardly-projecting pin 39, which enters the slot 44 in the outer casing. By turning the ring 38 the pin 39 is made to engage the oblique slot 44, so as to draw the cover-piece 40 more or less over the cover-piece 30. Now as sleeve 25 and spool 24 are held to cover-piece 30 by the catch 29 and as the sleeve 77 and frame 7, carrying the gearing, are held to the cover-piece 40 by catch 43 it follows that the drawing together or separation of the cover-sections by the action of the ring 38 (or otherwise) causes the clutch members 22 and 23 to become engaged or disengaged. Thus the telescopic movement of one cover-piece on the other couples or uncouples the winding-gear with the spool.

The ring 38 is close to the projection 35, which controls the drag. The operator, with one hand grasping the handle 2 and the other grasping cover 40, has his thumb or fingers in position to turn ring 38, and thus uncouple the winding-gear and at the same time bear in projection 35 to work the drag.

To insure the even spooling of the line, a traveler 50 reciprocates along guide-bar 51 and guides the line to the spool. As shown in Fig. 8, the traveler 50 carries a small pulley or line-guide 52, and the line which enters the casing at 49 extends through suitable supports and through said guide 52 to the spool.

The guide-bar 51 is supported at one end in a bracket 53, rigid with frame 7, and at the other end enters an opening in the wall of pocket 36 of cover-piece 30. The guide-bar can thus move out and in with reference to pocket 36 when the clutch is uncoupled or coupled, but all the time serves as a support for traveler 50. Traveler 50 is connected by pitman 53 with a crank-pin or wrist-pin on a traveler-moving worm-wheel 54. This worm-wheel 54 is journaled to frame 7 and is driven by a worm on shaft 55, which is supported in bearings on the same frame. The worm-shaft 55 carries a small pinion 56, rigid therewith. From the nature of the engagement of the worm and wheel the parts will remain at rest save when the worm-shaft is driven.

A segment 57 on sleeve 21 or on clutch member 22 has teeth enough to engage and turn pinion 56 so far with each revolution of sleeve 21 as may be needed to turn the worm-shaft a whole or partial turn, and thereby move the worm-wheel 54, which by its pitman 53 draws or pushes the traveler 50 along the guide-bar 51, and thus lays the line smoothly, coil on coil, on the spool. The half-rotation of worm-wheel 54 moves the traveler the length of the spool, and the next half-rotation carries the traveler and line-guide back along the guide-bar, so as to lay the line in smooth spirals on the spool.

The wrist-pin of the worm-wheel is shown as projecting a little beyond the periphery of the wheel, and the frame-bars are shown notched to permit the passage of segment 57. These are mere incidents coming within ordinary mechanical skill.

The cover-section 40 can be engaged by means of clasp 43 with sleeve 77. When disengaged from said sleeve and from the ring 38, the cover-section 40 can be moved along on rod 1, thus giving access to all the gearing which is inclosed by said cover 40 and not by cover 30. In like manner the disengagement of catch 29 permits the endwise movement of cover 30 with reference to the spool.

A buffer-spring 60 may be interposed between the handle 2 and the casing 30, so as to prevent jar and cause a quick reversal of movement.

The entire casing is of a size and shape to be conveniently grasped by one hand of the operator, and the other hand grasping handle 2 gives complete control of the rod for the operation of casting, reeling, or uncoupling of the winding-gear.

I have described the mechanism as actually constructed and in the best form now known to me; but I do not in many instances limit my claims to the precise construction as shown and described, as it is evident that some of the features of the invention are generically new and that claims limited to the specific form shown would not fairly protect my invention.

What I claim, and desire to secure by Letters Patent, is—

1. In combination with a reciprocating rod having a longitudinal rack, an inclosing casing surrounding the rod and containing a spool with its axis parallel with the rod, gears inclosed in the casing and engaging the rack and spool, to rotate the spool by the reciprocation of the rack, and a handle connected to the rod, substantially as described.

2. In a fishing-reel, an inclosing casing surrounding and extending lengthwise of the rod, a spool within said casing, the rod passing axially through the spool and casing, and a train of gears inclosed by the casing and operatively engaging the spool and rod substantially as described, whereby the longitudinal movement of the rod actuates the spool to wind the same.

3. In combination with a fishing-rod, a frame supported thereon through which the rod may reciprocate in direction of its length, a rack carried by the rod, and a cross-shaft having bearings in the frame and a pinion engaging the rack, pinions on said shaft at opposite sides of the rack and having clutch engagement with the shaft in reverse directions, intermediate pinions in train with such clutch-driven pinions and carrying bevel-gears, and a bevel-pinion in gear with both said bevel-gears and operatively connected with a winding-spool, whereby the reciprocation of the rod winds the spool in one direction only, substantially as described.

4. In a fishing-reel, the combination of the rod having a rack, a train of gears engaging the rack and driven thereby, a spool journaled on the rod and in train with said gears by means of a clutch, and a two-part casing, one part inclosing the spool and one clutch member, the other part inclosing the gears and the other clutch member, so that the closing of the casing-sections brings the train and clutch into operative engagement, substantially as described.

5. In a fishing-reel, the combination with the rod and train of gears actuated thereby, of a two-part casing, one part containing a spool, drag, and one clutch member, the other part containing a train of gears and the other clutch member, and means for retaining the casing-sections in a more or less closed relation, so that the clutch may be held in or out of engagement thereby, all substantially as described.

6. In combination with a fishing-rod, a train of gears having operative engagement with the rod, and a clutch member connected thereto, an inclosing casing-section having an inclined coupling-notch, a second casing-section inclosing the reel, which reel carries a clutch member, the cover-sections closing telescopically, the second section having a movable sleeve with a projection in position to engage the inclined notch of the first casing-section, all substantially as described.

7. In combination with a fishing-rod, a spool arranged longitudinally of said rod, and a train of gears engaging the rod and spool so that the longitudinal reciprocation of one part shall drive the other, a traveler driven by the gears and clasping the line, to lay the same smoothly on the spool, substantially as described.

8. In combination with a fishing-rod, a spool journaled thereon and extending lengthwise thereof, a train of gears in train with the rod and spool substantially as described, a guide-bar lengthwise of the spool and a traveler moving thereon to lay the line, a traveler-moving wheel and crank-pin connected by pitman to the traveler, and a segment-pinion in the spool-driving train engaging the traveler-moving wheel through intermediates, substantially as described.

9. In a fishing-reel, the combination of the rod and a spool having its axis on the rod, a train of gearing engaging the rod and spool to rotate the spool by reciprocation of the rod, a guide-bar extending in the direction of the length of the spool and a traveler moving thereon, a segmental pinion in the train of the spool-driving gear, a worm-shaft intermittingly driven thereby, and a worm-wheel driven from said shaft and having pitman connection to the traveler, all substantially as described.

10. In a fishing-reel, the combination of the rod, spool, and train of gears whereby the spool is driven by the reciprocation of the rod, a segment-pinion in the spool-driving train, a traveler and line-guide, and a train of driving mechanism intermediate the traveler and segment-gear, whereby the segment-gear moves the traveler and line-guide intermittingly as the spool rotates, to lay the line smoothly on the spool, substantially as described.

In testimony whereof I affix my signature in presence of two witnesses.

WILLIAM TRABUE.

Witnesses:
 ROBERT L. PAGE,
 CLAUDE W. SCOTT.